United States Patent
Stevens

(10) Patent No.: US 7,616,346 B2
(45) Date of Patent: Nov. 10, 2009

(54) PROCESSING IMAGE DATA FOR CONSISTENT COLOR PRINTING

(75) Inventor: Michael T. Stevens, Aloha, OR (US)

(73) Assignee: Xerox Corporation, Norwalk, CT (US)

( * ) Notice: Subject to any disclaimer, the term of this patent is extended or adjusted under 35 U.S.C. 154(b) by 842 days.

(21) Appl. No.: 11/313,128

(22) Filed: Dec. 19, 2005

(65) Prior Publication Data

US 2007/0139671 A1   Jun. 21, 2007

(51) Int. Cl.
*H04N 1/40* (2006.01)
*H04N 1/60* (2006.01)

(52) U.S. Cl. .................... 358/3.01; 358/1.9
(58) Field of Classification Search .......... 358/3.01, 358/1.9, 1.1, 2.1, 2.99, 3.02, 3.23
See application file for complete search history.

(56) References Cited

U.S. PATENT DOCUMENTS

| | | | |
|---|---|---|---|
| 6,249,601 B1 * | 6/2001 | Kim et al. | 382/162 |
| 6,429,950 B1 | 8/2002 | Ebner | |
| 6,456,395 B1 | 9/2002 | Ringness | |
| 6,646,763 B1 | 11/2003 | Estrada | |
| 6,690,489 B1 | 2/2004 | Jacob et al. | |
| 7,440,611 B2 * | 10/2008 | Qian et al. | 382/165 |

OTHER PUBLICATIONS

Addison Westley Publishing Company, Adobe Systems Incorporation; PostScript—Language Reference—Third Addition; pp. 1-21, 175-311, 457-504, 505-523, 811-815; Feb. 1999.

* cited by examiner

*Primary Examiner*—Douglas Q Tran
(74) *Attorney, Agent, or Firm*—Fleit Gibbons Gutman Bongini & Bianco P.L.

(57) ABSTRACT

Present systems and methods enable digital color printers to consistently print color output from computer generated image data that includes spot color definitions. Colors that are defined as spot colors can be separated from colors that are defined as combinations of process colors. Accordingly, color corrections can be separately applied to objects that are defined by spot color definitions to provide customized image processing that provides printed color images with improved quality.

10 Claims, 6 Drawing Sheets

FIG. 5

| | | |
|---|---|---|
| 50 | CID Yellow 05 | [0.00; 0.01; 1.00; 0.00] |
| | CID Orange 12 | [0.00; 0.53; 1.00; 0.00] |
| | CID Red 35 | [0.00; 0.90; 0.86; 0.00] |
| | CID Purple 81 | [0.38; 0.88; 0.00; 0.00] |
| | CID Violet | [0.98; 1.00; 0.00; 0.00] |
| 50 | CID Blue 17 | [1.00; 0.88; 0.00; 0.05] |
| | CID Blue 22 | [1.00; 0.10; 0.00; 0.10] |
| | CID Green | [1.00; 0.00; 0.59; 0.00] |
| | CID Indigo 4 | [0.42; 1.00; 0.00; 0.49] |
| | CID Black | [0.00; 0.13; 0.49; 0.98] |
| 50 | CID Process Yellow | [0.00; 0.00; 1.00; 0.00] |
| | CID Process Magenta | [0.00; 1.00; 0.00; 0.00] |
| | CID Process Cyan | [1.00; 0.00; 0.00; 0.00] |
| | CID Process Black | [0.00; 0.00; 0.00; 1.00] |

Columns: 52, 54; Box: 60

PROCESSING IMAGE DATA FOR CONSISTENT COLOR PRINTING

TECHNOLOGY

This relates to the printing of color images and more particularly, to processing color digital image data to obtain consistent colors in color images that are printed on different devices.

BACKGROUND

Generally, color printing is accomplished by creating monochrome subsets of an image and combining the subsets to obtain the full color image. For example, digital printers typically generate color output by developing each of four electrostatic latent images with a cyan (C), magenta (M), yellow (Y) or black (K) "process color", then superimposing the developed images to form the complete image. Production printing presses generate color hardcopies by generating several printing plates, covering each plate with a different color ink and transferring the ink from the separate plates to the hardcopy sheet. Most printing presses generate at least four printing plates, one for providing ink in each of the process colors.

Each of the C, M, Y and K colorants absorbs light in a limited spectral region of the range of visible light; cyan colorant absorbs red light, i.e., prevents light having a wavelength of approximately 650 nm from being reflected from the image, magenta colorant absorbs green light (light having a wavelength of approximately 510 nm) and yellow colorant absorbs blue light (light having a wavelength of approximately 475 nm). Black colorant absorbs all wavelengths of light and can be deposited onto the latent image rather than depositing all three colorants at the same location. The printable colors are produced by combining the different colorants in various ratios. For example, to generate a blue region in a hardcopy image, relatively high amounts of colorant will be deposited onto corresponding locations of the C and M separations, with little or no colorant deposited in the corresponding location of the Y separation. The cyan and magenta colorants will absorb the red and green light and thus, only blue light will be reflected from the hardcopy sheet and perceived by the viewer.

While printers can usually reproduce a significant number of colors by combining process colors, such combinations cannot be used to reproduce every color in the spectral range of visible light. Printing presses typically provide the additional colors by transferring specially mixed "spot color" inks from printing plates that are formed for that purpose. Digital printers cannot typically add spot colors and thus, the color gamut for a printer is somewhat limited. The size of the gamut colors for a particular printer depends upon several factors, including the processing capability of its image processor, the type and quality of the marking material and output media used and the viewing environment.

Computer generated color images are printed on both printing presses and color printers. The data used to reproduce these images is sometimes provided in "bit map" form, with color values assigned to the pixels in each separation to independently control the deposit of C, M, Y or K marking materials. Image data is also provided as page descriptions that describe how the printer should mark the page in order to print the document. Printer Control Language, produced by Hewlett Packard, Palo Alto, Calif., Advanced Function Presentation, produced by IBM, Armonk, N.Y. PostScript and Portable Document Format (PDF), both produced by Adobe Systems Incorporated of Mountain View, Calif. are examples of well known page description languages (PDLs) can generate printable image data.

While PDLs generally provide a device-independent way to print images, some aspects of page description are device dependent. For example, PDLs use a look-up stored on the host computer to define the colors of the objects in the image. Generally, a look-up table is a database that associates color names or other references to the color values that control the deposit of marking material in the concentrations required by a specific printing device. As these color values are determined based upon the output characteristics of a specific device, the colors in the printed output are often incorrect if the file is printed using another printer. It would be advantageous to process color image data to provide consistent colors in images that are printed on any device.

REFERENCES

U.S. Pat. No. 6,690,489 discloses a graphics language interpreter including one or more color converters that accept input color values and that algorithmically convert such input color values to output color values.

U.S. Pat. No. 6,646,763 discloses methods, systems, and apparatus for mapping a nonspectral representation of a target color, such as an input color tuple, to a set of concentration values for a set of device-specific colorants.

U.S. Pat. No. 6,456,395 discloses a method for color separating an image stored in an encapsulated POSTSCRIPT (EPS) file to be printed to a spot-color printing plate.

U.S. Pat. No. 6,429,950 discloses a method and apparatus that uses simple interpretive programming language commands to generate and register object characterization information in the form of tags appended to a plurality of pixel display values stored in the frame buffer of a digital imaging device.

SUMMARY

Aspects of present systems and methods provide a method that includes receiving an image data file at an electronic device; identifying a spot color reference in the image data file; searching a spot color dictionary for a color identifier related to the spot color reference; retrieving from the spot color dictionary, a color vector associated with the spot color related color identifier; selecting a color vector emulation color space based upon a dimension of an identified color vector; and transforming the color vector to a color value in the selected emulation color space based upon a color vector attribute.

In one aspect, a digital printing device includes a memory that maintains a spot color dictionary; an image processor configured to receive an image data file containing a color definition and generate halftone color data corresponding to the color definition; and a print engine incorporating a raster output scanner, an imaging member and a plurality of colorants, the print engine being configured to receive the halftone color data and deposit a plurality of the colorants onto the imaging member as prescribed by the halftone color data, with the image processor being further configured to identify a color reference embedded in the image data file color definition, to retrieve a color vector associated with the color reference from the spot color dictionary, to select an emulation color space based upon a color vector dimension, to transform the color vector to a color value in the selected emulation color space based upon a color vector attribute; and to incorporate the selected emulation color space color value into the halftone color data.

In another aspect, a database includes at least two objects, with at least one of the at least two objects being a color identifier and at least one of the at least two objects being a multi-dimensional color vector.

In yet another aspect, a database includes a plurality of dictionaries, each of which has at least two objects, with at least two of the at least two objects being a color identifier and an associated a multi-dimensional color vector.

BRIEF DESCRIPTION OF THE DRAWINGS

FIG. 5 is a block diagram showing how features provided by a page description language can be used to define resources that enable a digital printer to print hardcopy images with consistent colors;

DETAILED DESCRIPTION

Figure 1:
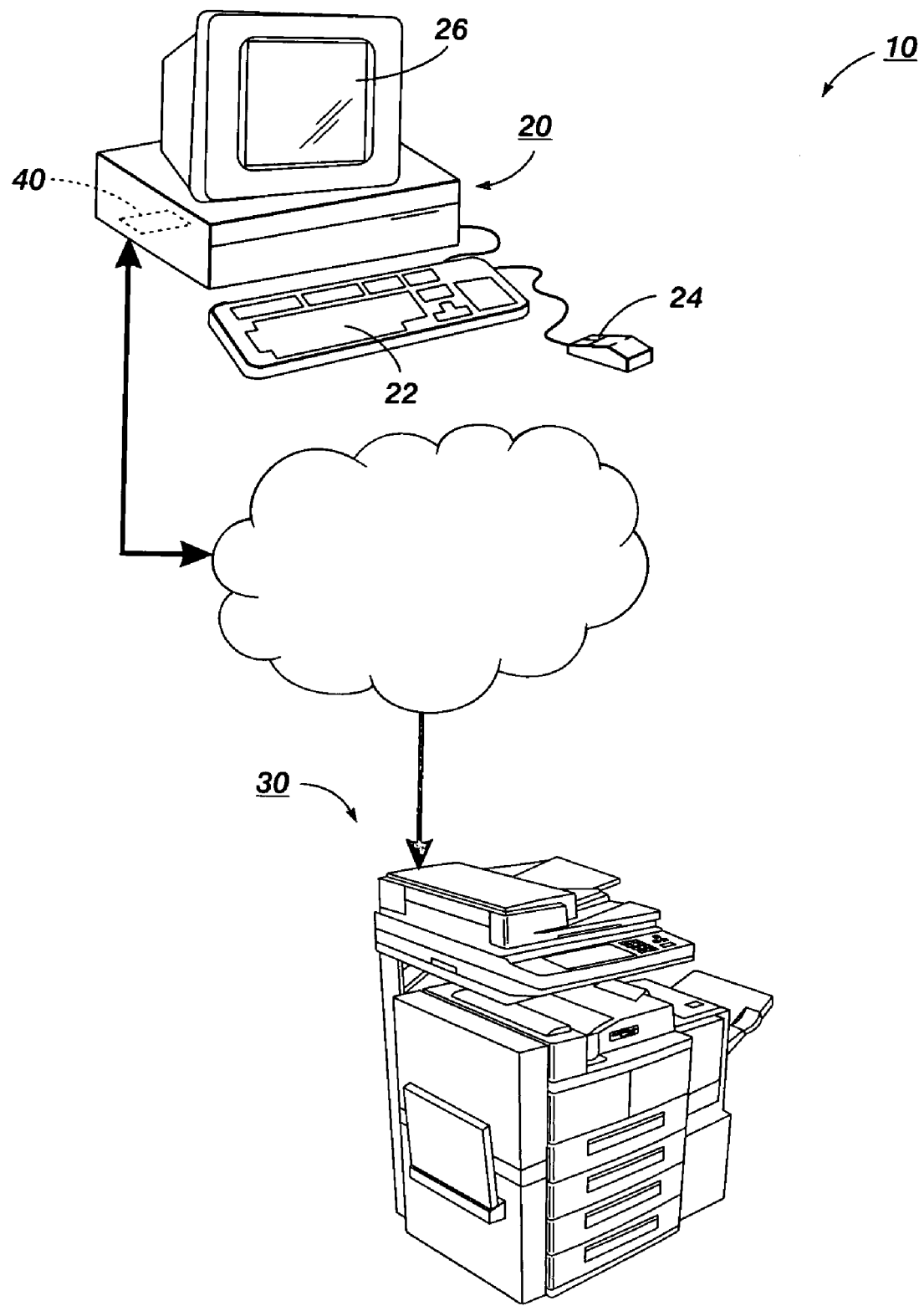
FIG. 1 is a diagram showing an exemplary system that can be used to create and reproduce digital color images.

For a general understanding of the present systems and methods, reference is made to the drawings, in which like reference numerals have been used throughout. The following term(s) have been used herein to describe present systems and methods:

As used herein a "color" is the perception of light in a specified range of wavelengths as detected by the human eye.

A "colorant" is a material that is added to an object to induce a change in its color.

A "separation" is a medium generated for separately reproducing a single colorant.

As used herein a "process color" is one of a finite set of colors that can be combined with the others to create the available colors. Process colors are represented as digital files that include a set of luminance and chrominance values that are used to reproduce the color.

A "spot color" is a color that is generated using a single colorant. Spot colors are represented as digital files that include a set of intensity values that represent to the amount of colorant corresponding to the spot color that should be applied to an area of the image.

A "transformation procedure" is a process for converting image data from application space coordinates to device space coordinates.

An "operator" is a word that causes an image processor to carry out a predefined action.

An "object" is a piece of data that is manipulated by a page description language to describe a page.

An "array" is a one-dimensional collection of objects.

A "dictionary" is a table that associates pairs of objects.

A "key" is an object in a dictionary that is associated with a value. When a PDL application refers to a key, the image processor searches the open dictionaries for the first instance of that key to retrieve the associated value.

A "name" is a sequence of characters that cannot be interpreted as a number.

A "resource category" is a collection of named objects that are associated with a common name. For example, "fonts" and "forms" are distinct resource categories.

A "color vector" is a multi-dimensional object with an angle and a length that can be used to specify a color value in a color space.

Referring to FIG. 1, present systems and methods may be used to provide printed color images using a system 10 that includes a host computer 20 and a raster output printing device 30 such as, for example, a laser printer, an ink-jet printer, a digital printing press, etc. Host computer 20 may also be linked to a video monitor 26 and/or to a keyboard 22, a mouse 24 or other input/output device. In the example, shown, host computer 20 has one or more software applications 40 stored in a memory along with a look-up table that a software application 40 can use to associate color names or other references to color values that control the deposit of component colorant concentrations for a selected output device.

Software application 40 can be used to create a color image 42 that can be displayed on video monitor 26 and/or printed at printer 30. In one aspect, software application 40 generates printable image data using a page description language (PDL), which describes the objects on each page in terms of abstract graphical elements. A page description language typically generates an image data file 44 containing commands that instruct printer 30 how to deposit marking material onto a page to reproduce objects displayed in color image 42. Unlike the pixel value assignments provided by a bit map, page descriptions are "device-independent." That is, they are unrelated to the output characteristics of any particular device. Present systems and methods are hereinafter described with reference to a software application 40 that uses the Adobe PostScript PDL ("PostScript"). It is understood, however, that other types of software applications 40 may be used.

Figure 2:
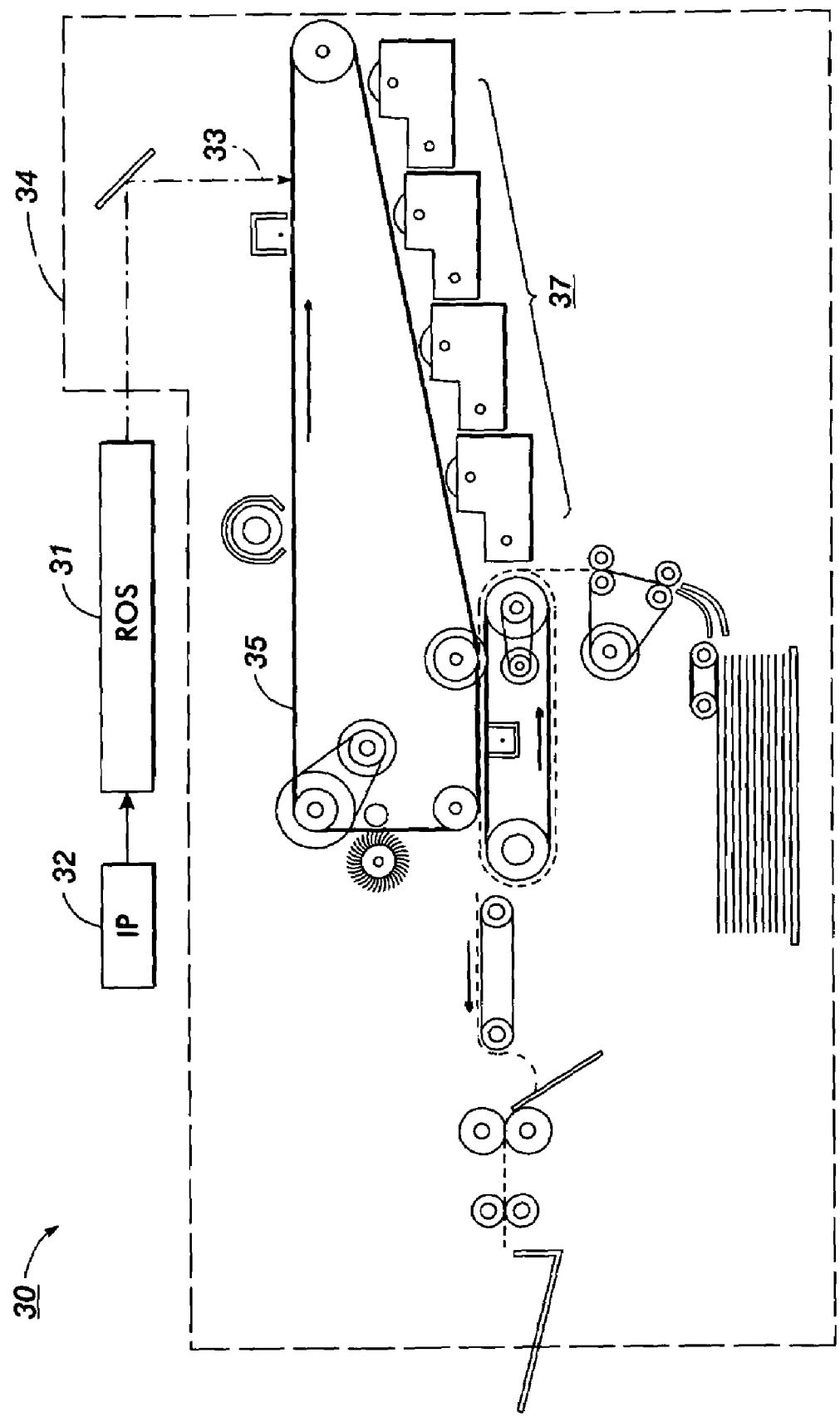
FIG. 2 is a detailed illustration showing an example of a color printer.

Turning to FIG. 2, image data file 44 is forwarded from host computer 20 to printer 30, where an image processor (IP) 32 transforms the page description to halftone data, which is used by a print engine 34 uses to drive the modulated light 33 of a raster output scanner (ROS) 31. Modulated light 33 exposes the surface of a uniformly charged photoconductive belt 35 to achieve a set of subtractive latent images that are subsequently developed by depositing cyan (C), magenta (M), yellow (Y) and black (K) "process color" colorants 37 onto the charge retaining locations of belt 35. The hardcopy color image is then formed by transferring the developed images to a hardcopy sheet in superimposed registration.

Figure 3:
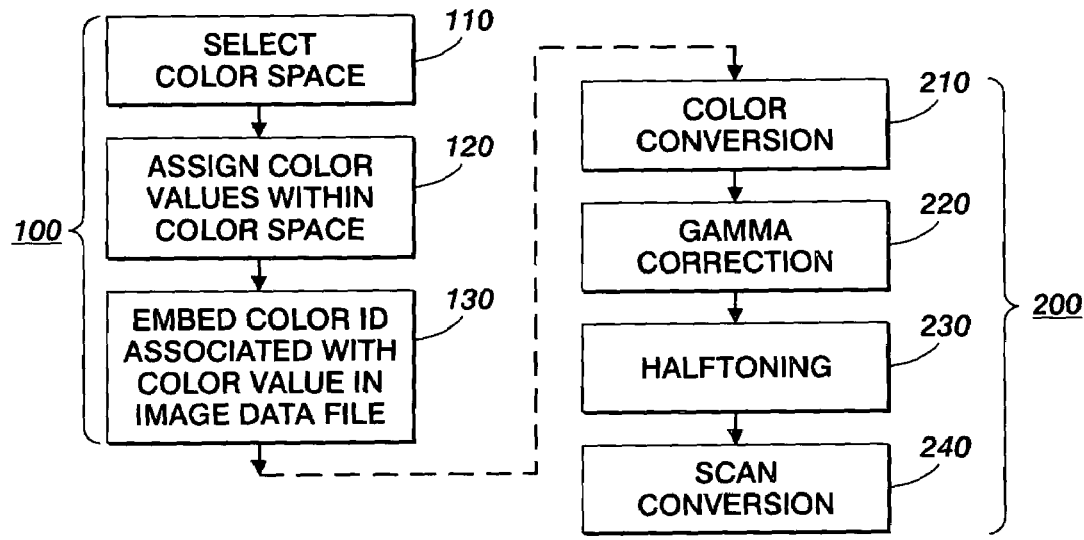
FIG. 3 is a flow diagram showing one example of how a page description language may specifies and process color specifications in an image data file.

In one aspect, software application 40 defines the colors of the objects described in image data file 44 using a color definition procedure 100 such as that illustrated in FIG. 3. Generally, software application 40 selects a color space as shown in block 110 and as shown at block 120, specifies color values that will cause an identified output device 46 (not shown) to reproduce the desired colors in the selected color space. In one aspect, software application 40 selects the color values for the native color space of an output device 46 that is identified by a user. For example, if output device 46 is a video monitor, software application 40 may select the RGB color space and provide color specifications that are defined by three component color values that represent the red (R), green (G) and blue (B) components of visible light that the selected monitor will use to display the image. If output device 46 is a color printer, software application may instead select the CMYK color space and provide color specifications that are defined by four component color values that the selected printer will use to deposit cyan (C), magenta (M), yellow (Y) and black (K) colorants onto the hardcopy sheet. The color values for the selected color space are embedded in image data file 44 as shown at block 130.

It may be desirable to forward a single image data file 44 to different types of devices for printing. For example, image data file 44 may be forwarded to a commercial printing press to provide a set of documents that are presented to customers and also printed on an office printer to provide a set of the same documents that are distributed to employees. Accordingly, software applications 40 typically generate image data files 44 with color specifications that provide as much detail as possible, without consideration of whether the information can be processed by any particular output device and the determination of how any unusable data will be processed is left to printer 30. For example, a printer 30 that reproduces colors only by combining process colors must determine how to process color specifications that identify spot colors.

Known software applications 40 provide color specifications that include "color names" that are widely used by those who operate different types of devices to uniquely identify colors. For example, Adobe Systems Inc., of San Jose, Calif., Corel Corp., of Ottawa, Ontario, Canada, Microsoft Corp., of Redmond, Wash. and Quark, Inc., of Denver, Colo. each provide software applications that use "Pantone Colors," which are provided by Pantone, Inc., Carlstadt, N.J. to facilitate accurate color selection. Software applications 40 also use systems provided by Maibec Industries, Inc., Quebec, Canada ("Truematch"), Colwell Industries, Inc., Minneapolis, Minn. ("Colorcurve"), Kikuze Solutions Pte. Ltd, Singapore ("Focaltone") and Toyo Ink Mfg. Co., Tokyo, Japan ("Eco Match") to identify colors by name.

Still referring to FIG. 3, printer 30 receives image data file 44 from host computer 20 and uses a color rendering procedure 200 to print color image 42 in hardcopy format. As shown, color rendering procedure often performs color conversion, illustrated at block 210, to convert the color specifications in image data file 44 to the native color space of printer 30. For example, if software application 40 generates an image data file 44 for a video output device 46, image data file 44 may contain RGB data that is converted to CMYK format at block 210. Color rendering procedure also includes gamma correction, shown at block 220, which corrects distortions that are introduced by printer 30, halftoning, illustrated at block 230, which converts the image data to the binary format required by printer 30 and scan conversion, shown at block 240, which places the markings onto the output sheet.

During halftoning (block 230), IP 32 typically references a look-up table stored on a host computer that is linked to printer 30, rather than the look-up table associated with output device 46, which is stored on host computer 20. If the color name-color value associations in the look-up table used by printer 30 differ from those contained in the look-up table of output device 46, the hardcopy image provided by printer 30 often displays the wrong colors.

Output device 46 typically generates an image data file 44 that provide color specifications that identify process color combinations at block 210 (or with specifications that provide color values that can easily be converted to process color combinations, e.g., RGB data). Quite often, output device 46 also provides at least some color specifications that identify spot colors. Color definitions for spot colors usually provide a device-dependent or CIE-based color space along with the color values that output device 46 can use to reproduce the color.

For example, a software application 40 that uses PostScript may define a color that can be reproduced as a combination of process colors by selecting a color space and providing a color vector for reproducing the color in the selected color space. The following text string is an example of a PostScript array that can be used to select the CMYK color space: "[/DeviceCMYK] setcolorspace." A command such as this would typically be followed by a string such as: "[/value-c: value-m: value-y: value-k] setcolor," which provides the C, M, Y and K component color values used by output device 46 to reproduce the color in the CMYK color space.

In contrast, software application 40 would typically define a spot color using the following text: "[/Separation RefName alternativeSpace tintTransform] setcolorspace," followed by the text "[/value-s] setcolor," wherein value-s is a single tint component between 0.0 and 1.0. The term "alternativeSpace" represents an alternative color space for reproducing the color and the term "tintTransform" identifies a procedure used to convert "value-s" to the alternate color space. A printer that reproduces colors as process color combinations can respond to the following syntax by emulating the spot color identified as "RefName Red 081 D":

```
[
/Separation
(RefName Red 081D)
/DeviceCMYK
{
    dup 0.00 mul exch
    dup 0.87 mul exch
    dup 0.91 mul exch
    dup 0.00 mul exch pop
}
] setcolorspace
```

In other words, printer 30 can completely withhold colorant from the specified pixels in the cyan separation, deposit 87% of the maximum available colorant at the same pixels in the magenta separation, deposit 91% of the maximum available colorant at the same pixels in the yellow separation and completely withhold colorant from the same pixel in the black separation to emulate the color RefName Red 081 D in the CMYK color space. The term "RefName" is a generic term for a color name or other reference of the type commonly used in commercially available color matching systems. For example, the color names "Cosmos Blue 2712," "Lionogen Violet VC6100," "Lionol Green 6Y-501" and "Rubine RLD" are known as unique identifiers for the associated colors.

The differences in the way software applications 40 define process and spot colors can be used to identify the color definitions for spot colors and significantly, to modify those definitions to obtain accurate color reproduction on any digital printer. For example, the definition for a spot color in a PostScript command can be identified by a request for an emulated color space and a customized operation can be defined to modify the spot color request to satisfy a specific requirement of the application.

Digital printers that are currently available offer options for emulating certain printing conditions. For example, Xerox Phaser® printers provide color correction options that simulate the print of printing presses that meet the SWOP Press (Specification for Web Offset Publications) Press, SNAP Press (Specifications for Non-Heat Advertising Printing) Press, Commercial Press (Four-Color U.S.) and Euroscale Press standards, which enables users to preview their images before they are actually printed on the selected device. When such options are selected, a predefined color correction is automatically applied to the colors defined in image data file 44.

Since spot color definitions provide their own color transformation commands, many color printers are unable to print spot colors accurately when an automatic color correction has been selected. More specifically, if one of the printing press emulations has been selected, the color correction that simulates the printing press overrides the tintTransform procedure of the spot color specification.

In one aspect, since objects in image data file 44 with colors defined by process colors can be distinguished from those defined by spot colors, objects with spot color definitions can be directed to a color correction path that is specially created to process spot colors for the selected printing press and objects with process color definitions can be directed to the standard printing press color correction.

Figure 4:
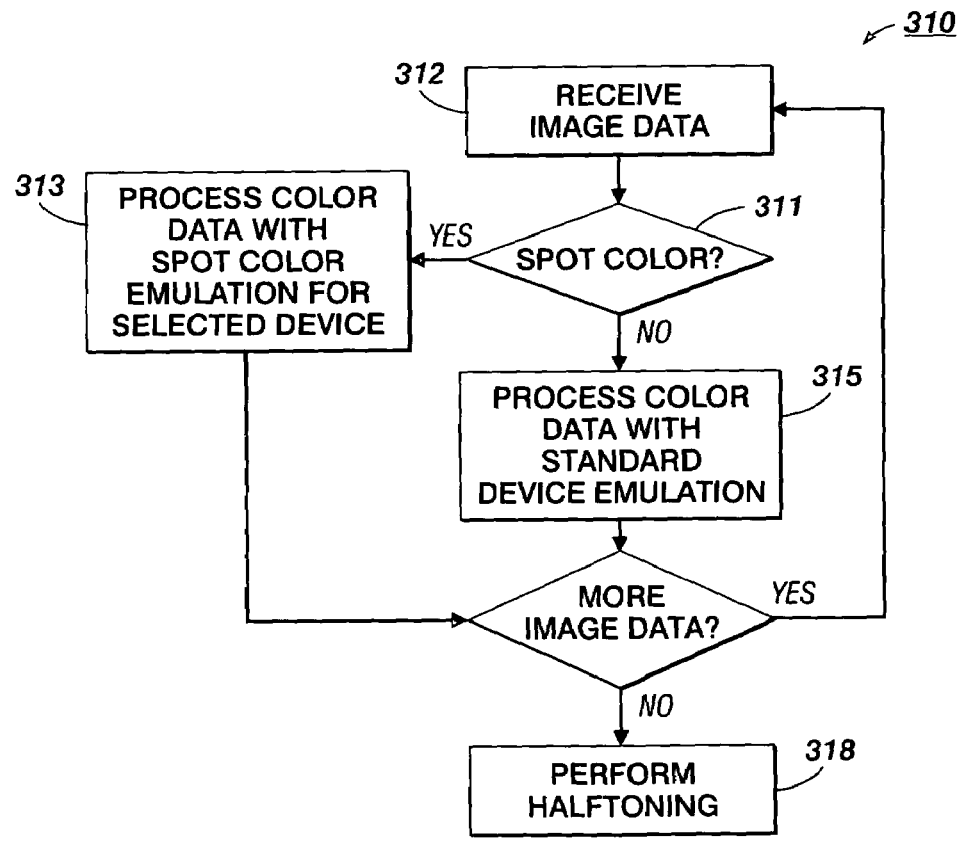
FIG. 4 is a block diagram showing how separate color corrections can be applied to objects with colors defined as spot colors and objects defined as process color combinations.

Turning to FIG. 4, present systems and methods use a spot color identification procedure 310 to isolate objects with colors that are defined as spot colors. When printer 30 receives an image data file 44, IP 32 searches for spot color definitions as shown in block 311. For example, if PostScript is used, IP 32 determines that a spot color is present when a "/Separation" command, which requests a color space for defining spot colors, is found in image data file 44. Color processing can then be applied to each object based upon its color definition type.

In one aspect, to provide a printed data that emulates the output provided by a selected device, colors that define objects as spot colors may be subjected to a spot color correction process as shown at block 313, which differs from a process color correction process that is applied to colors that define objects as process color definitions as shown at block 315. IP 32 performs halftoning when color data has been processed for all of the objects in the image as indicated in block 318.

While the color names in spot color requests are device-independent, the alternate color space and transformation procedure commands are defined based upon the output characteristics of output device 46. Accordingly, the colors output by printer 30 will be incorrect if the alternate color space and transformation procedure were selected for a different target printer.

Turning to FIG. 5, present systems and methods add custom features to a control program IP 32 uses to interpret an image data file 44 generated by a page description language program. In one aspect, present systems and methods provide a "SpotColor Resource Category" (SRC) 60 that includes a plurality of Spot Color Dictionaries (SCDs) 50. SCDs 50 contain a plurality of Color Identifiers (CIDs) 52, each of which is a key associated with a Spot Color Vector (SCV) 54. CIDs 52 identify the color names that may be embedded in an image data file 44 by a software application 40. A CID 52 may relate to color names that are provided by Pantone, Truematch, Colorcurve, Focaltone and other known color matching systems.

In one aspect, SCV 54 is a multi-dimensional color vector that defines an output color. In one aspect, SCV 54 is a three dimensional value that represents the red, green and blue components of visible light that are combined to produce a specified color. In another aspect, SCV 54 is a four dimensional value that represents the cyan, magenta, yellow and black colorant concentrations that create a printed image. In one aspect, SCV 54 is stored in a memory linked to printer 30.

Figure 6:
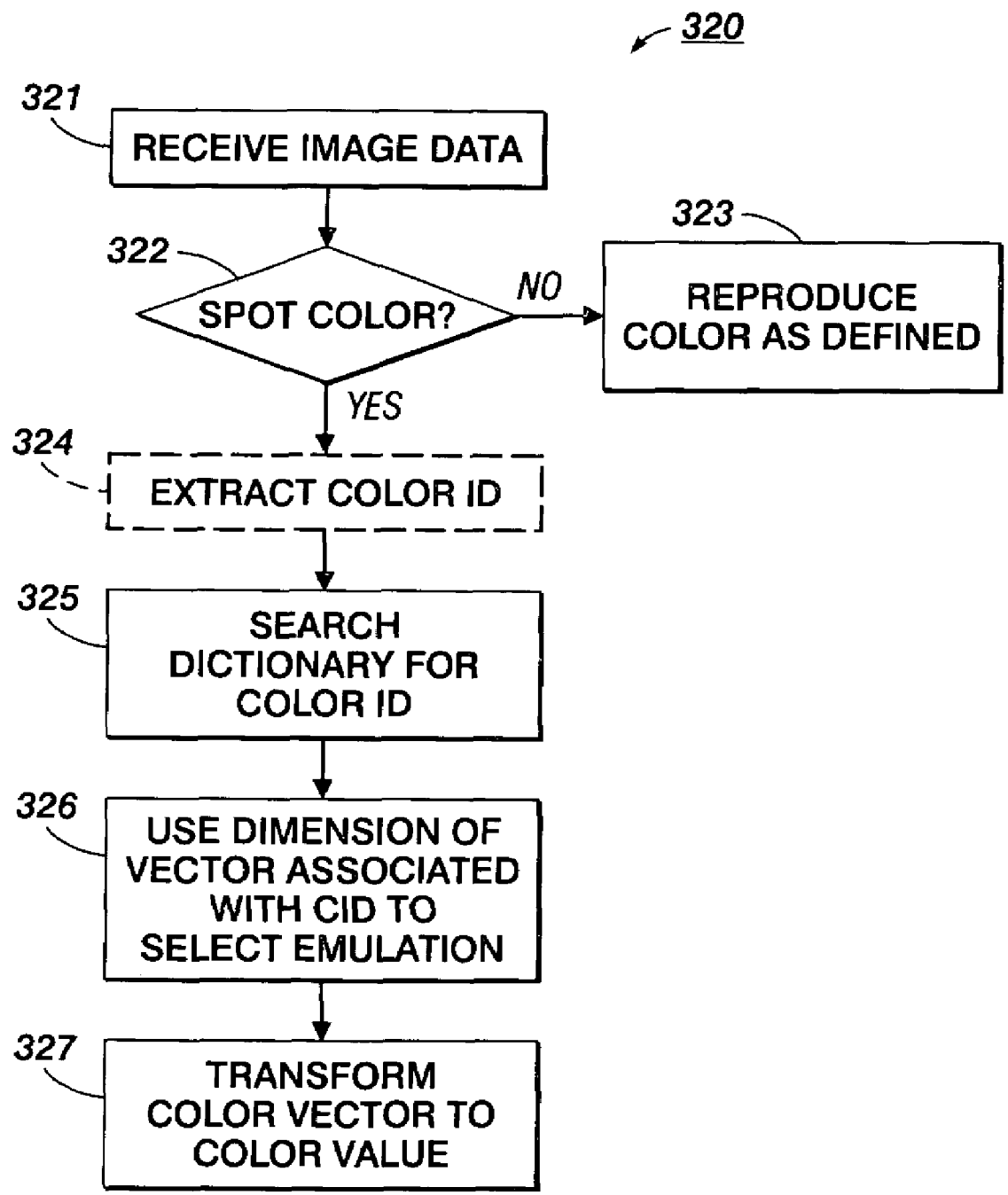
FIG. 6 is a block diagram showing an example of a spot color identification procedure for identifying and modifying a spot color specification in a page description language file.

Turning to FIG. 6, present systems and methods provide a spot color correction procedure 320 that modifies the color specifications for objects with colors that are defined as spot colors. When a spot color definition is encountered in image data file 44, IP 32 initiates a search through the SRC 60 hierarchy to obtain the color data that can be used to accurately reproduce the requested color. In one aspect, when image data file 44 is delivered to printer 30 as shown at block 321, IP 32 begins searching image data file 44 for a spot color name as shown in block 322. If no spot color name is found, IP 32 concludes that the color specification is for a process color combination and the color is reproduced normally as shown at block 323. However, if IP 32 locates spot color name, the alternateSpace parameter in the color definition is replaced with /DeviceRGB if SCV 54 is a three dimensional value or with /Device CMYK if SCV 54 is a four-dimensional value. IP 32 will then provide either an RGB color value or a CMYK color value to replace the tintTransform parameter by converting SCV 54 to the identified alternateSpace.

Since CIDs 52 are not linked to any particular color matching system, present systems and methods need not process any portion of image data file 44 that is relates only to a specified color matching system. Thus, in one aspect, present systems and methods may optionally extract CID 52 from the data image data file 44, or delete (or modify, ignore, bypass, etc.) references to color matching information from image data file 44 at block 324. Accordingly, present systems and methods can be used with colors provided by multiple color reference systems. It is understood, however, that present systems and methods can be used without removing information for specific color reference systems.

In one aspect, a hashing function may be applied to image data file 44 to remove a predetermined number of characters from a predetermined position of image data file 44. For example, the hashing function may delete the first five characters of the text string that incorporates CID 52 or leave the first six characters and delete the next three, etc.

Figure 7:
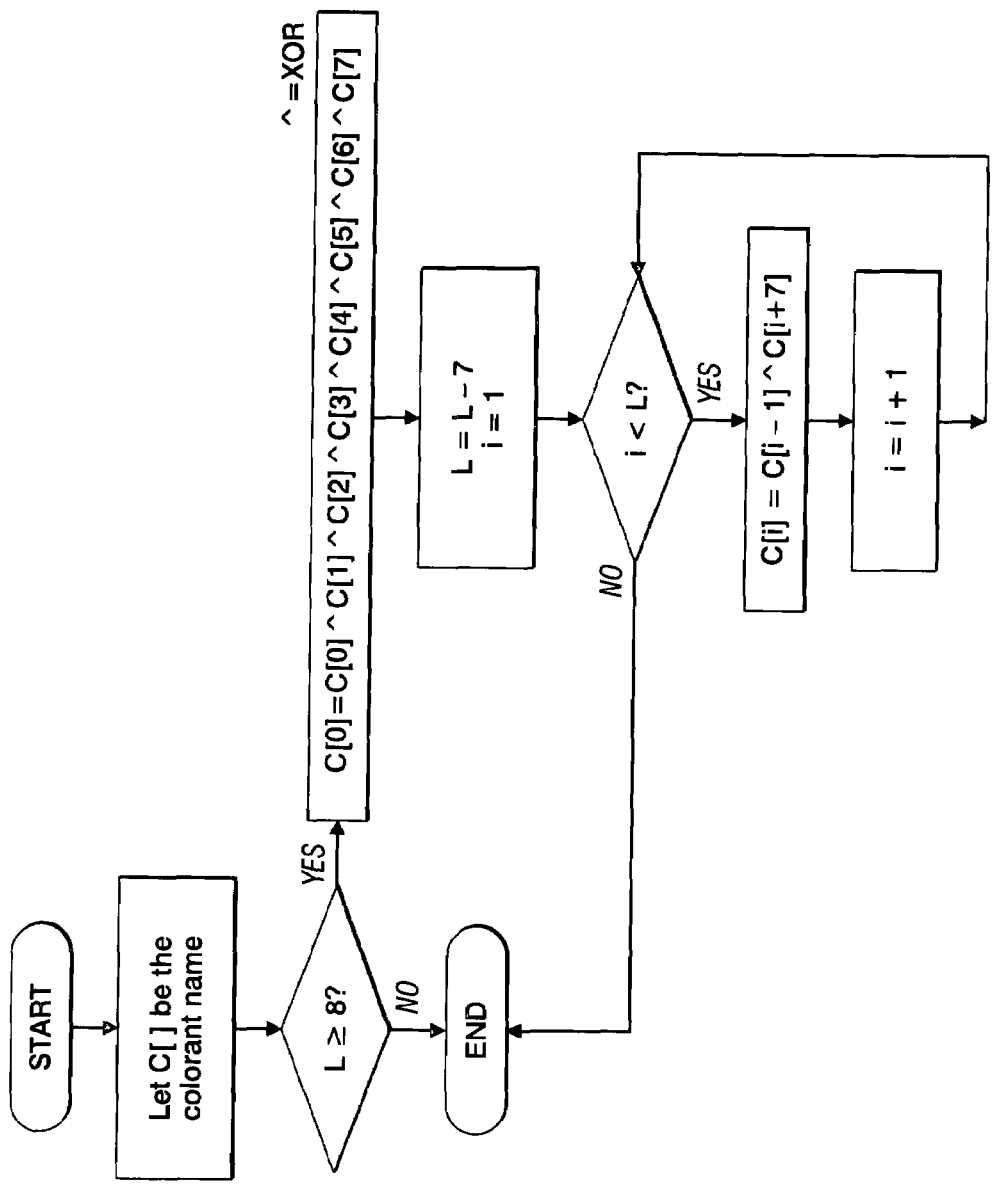
FIG. 7 is a flow diagram illustrating an exemplary hashing function.

In one aspect, a "hashing function" may be used to map color names that are widely used to CIDs 52 or to references that are proprietary or are not otherwise available to the public. Present systems an methods may then search SCD 50 for CID 52, rather than a spot color name. As shown in FIG. 7, an algorithmic mapping may be applied to the color definition identified in image data file 44 before IP 32 initiates its search of SCD 50. Accordingly, the entire gamut of printer 30 can be used to reproduce colors without requiring the presence of the exact references that are used by all of the available color matching systems in look-up table maintained by printer 30 to reproduce widely used colors.

For example, an algorithm may convert the first X characters of the color definition string to the first Y characters of a CID 52. It is noted that the memory required is likely to be reduced if X>Y. However, present systems and methods may be used if X=Y or X<Y. In one aspect, mapping may take the form of an exclusive or (XOR) operation performed on the data. The remaining characters of CID 52 may be provided by simply copying some portion of the remaining characters of the color definition string to an identified portion of CID 52. It is understood that present systems and methods may also search SCD 50 for an entire spot color name, or search for a CID 52 that is obtained without applying an algorithm such as that described and that they may be used with a CID 52 obtained without using any algorithm or mathematical function.

Color identification procedure 310 also includes searching the default SCD 50 at block 325 to locate the identified CID 52. In one aspect, a user may design a user custom SCD 50 with definitions for customized colors, such as those used in a logo. In another aspect, SCDs 50 may be provided with the color names provided by one or more color matching systems that provide spot colors. In another aspect, printer 30 may maintain a SCD 50 to provide its own color definitions. In one aspect, color identification procedure may, for example, first search user custom SCD 50 for an identified color name, then one or more color matching systems and finally search the SCD 50 maintained by printer 30 only if the spot color has not been identified.

When the CID 52 (or spot color) identified by image data file 44 is located, IP 32 retrieves the associated SCV 54 and uses it to select an alternative color space as indicated at block 326. More specifically, if SCV 54 is a three dimensional vector the "alternateSpace" information is replaced with /DeviceRGB and if SCV 54 is a four dimensional vector the "alternateSpace" information is replaced with /DeviceCMYK. SCV 54 is also used at block 327 to replace the tintTransform portion of the data in image data file 44 with the color values that reproduce the color in the selected color space as shown at block 327.

While present systems and methods are described as being used with software applications that have been provided by the aforementioned entities, that use a PDL to generate image data files and that and use proprietary color naming systems, it is understood that present systems and methods could be used with other software applications, that generate image data in other was and that present systems and methods may be used with any references that are embedded in image data files 44 to define colors. It is also understood that the commands provided by an image data file 44 may be used by output devices other than printers.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A digital printing device, comprising:
    a memory that maintains a spot color dictionary;
    an image processor configured to receive an image data file containing a color definition and generate halftone color data corresponding to said color definition; and
    a print engine incorporating a raster output scanner, an imaging member and a plurality of colorants, said print engine being configured to receive said halftone color data and deposit a plurality of said colorants onto said imaging member as prescribed by said halftone color data,
    with said image processor being further configured to:
    identify a color reference embedded in said image data file color definition,
    retrieve a color vector associated with said color reference from said spot color dictionary,
    select an emulation color space based upon a color vector dimension,
    transform said color vector to a color value in said selected emulation color space based upon a color vector attribute; and
    incorporate said selected emulation color space color value into said halftone color data.

2. A digital printing device as claimed in claim 1, wherein said image processor is further configured to retrieve a color vector from said spot color dictionary that has a first dimension representing a red component of visible light reflected from an image, a second dimension representing a blue component of visible light reflected from an image and a third dimension representing a red green component of visible light reflected from an image.

3. A digital printing system as claimed in claim 1 wherein said image processor is further configured to retrieve a color vector from said spot color dictionary that has a first dimension representing a concentration of cyan colorant to be deposited in an image, a second dimension representing a concentration of magenta colorant to be deposited in an image and a third dimension representing a concentration of yellow colorant to be deposited in an image.

4. A digital printing system as claimed in claim 1, wherein said image processor is further configured to retrieve a color vector from said spot color dictionary that has a fourth dimension representing a concentration of black colorant to be deposited in an image.

5. A method, comprising:
    receiving an image data file at an electronic device;
    identifying a spot color reference in said image data file;
    searching a spot color dictionary for a color identifier related to said spot color reference;
    retrieving from said spot color dictionary, a color vector associated with said spot color related color identifier;
    selecting a color vector emulation color space based upon a dimension of an identified color vector; and
    transforming said color vector to a color value in said selected emulation color space based upon a color vector attribute.

6. A method as claimed in claim 5 further comprising:
    extracting said color identifier from said spot color reference; and
    using said color identifier to retrieve said color vector.

7. A method as claimed in claim 6 further comprising searching a plurality of spot color dictionaries for said spot color reference related color identifier until said color identifier is located.

8. A method as claimed in claim 7 further comprising searching a user custom spot color dictionary for said color identifier.

9. A method as claimed in claim 7 further comprising searching a color matching system spot color dictionary spot color dictionary for said color identifier.

10. A method as claimed in claim 5 wherein said electronic device is a digital printer and said spot color dictionary is stored in a local memory linked to said digital printer.

* * * * *